United States Patent
Holmbom et al.

(10) Patent No.: US 9,963,600 B2
(45) Date of Patent: May 8, 2018

(54) HYDROPHOBISATION COMPOSITION, METHOD FOR HYDROPHOBISATION AND SUBSTRATE

(71) Applicant: Oy Separation Research Ab, Turku (FI)

(72) Inventors: Thomas Holmbom, Turku (FI); Bjarne Holmbom, Turku (FI)

(73) Assignee: Oy Separation Research Ab, Turku (FI)

( * ) Notice: Subject to any disclaimer, the term of this patent is extended or adjusted under 35 U.S.C. 154(b) by 110 days.

(21) Appl. No.: 14/910,769

(22) PCT Filed: Aug. 19, 2014

(86) PCT No.: PCT/FI2014/050636
§ 371 (c)(1),
(2) Date: Feb. 8, 2016

(87) PCT Pub. No.: WO2015/025083
PCT Pub. Date: Feb. 26, 2015

(65) Prior Publication Data
US 2016/0185986 A1    Jun. 30, 2016

(30) Foreign Application Priority Data

Aug. 19, 2013 (FI) ...................................... 20135840

(51) Int. Cl.
| | | |
|---|---|---|
| *C09D 7/12* | (2006.01) | |
| *D21H 17/02* | (2006.01) | |
| *D21H 19/14* | (2006.01) | |
| *D21H 21/16* | (2006.01) | |
| *C14C 11/00* | (2006.01) | |
| *D06M 13/148* | (2006.01) | |

(52) U.S. Cl.
CPC ............. *C09D 7/1233* (2013.01); *C09D 7/63* (2018.01); *C14C 11/00* (2013.01); *D06M 13/148* (2013.01); *D21H 17/02* (2013.01); *D21H 19/14* (2013.01); *D21H 21/16* (2013.01)

(58) Field of Classification Search
CPC ...... C09D 7/1233; D21H 17/02; D21H 21/16; D06M 13/148
USPC ........... 428/221, 473, 537.1, 537.5; 524/380, 524/383
See application file for complete search history.

(56) References Cited

U.S. PATENT DOCUMENTS

| | | |
|---|---|---|
| 6,739,533 B2 | 5/2004 | Eckerman et al. |
| 2002/0043577 A1 | 4/2002 | Krasutsky et al. |
| 2008/0265222 A1 | 10/2008 | Ozersky et al. |

FOREIGN PATENT DOCUMENTS

| | | |
|---|---|---|
| FI | 102402 | 11/1998 |
| WO | 0238857 | 5/2002 |
| WO | 2004040982 | 5/2004 |
| WO | 2004042082 | 5/2004 |
| WO | 2005047304 | 5/2005 |
| WO | 2005090677 | 9/2005 |
| WO | 2006048280 | 5/2006 |
| WO | 2012160250 | 11/2012 |

OTHER PUBLICATIONS

Passialis et al., Water Repellent Efficiency of Organic Solvent Extractives From Aleppo Pine Leaves and Bark Applied to Wood, 53 Holzforschung 151 (1999).

*Primary Examiner* — Edward J Cain
(74) *Attorney, Agent, or Firm* — James C. Lydon

(57) ABSTRACT

A hydrophobisation composition, which includes a hydrophobisation extract obtained by extracting outer bark of birch in an organic and/or polar solvent and which includes at least 30 weight-% betulinol. Also disclosed is a method for hydrophobisation of a surface, which includes steps of applying a layer of hydrophobisation composition containing betulinol on a surface of a substrate, and drying and heat-treating the layer of hydrophobisation composition. A substrate having a surface which is hydrophobised by using the method is also disclosed.

20 Claims, 1 Drawing Sheet

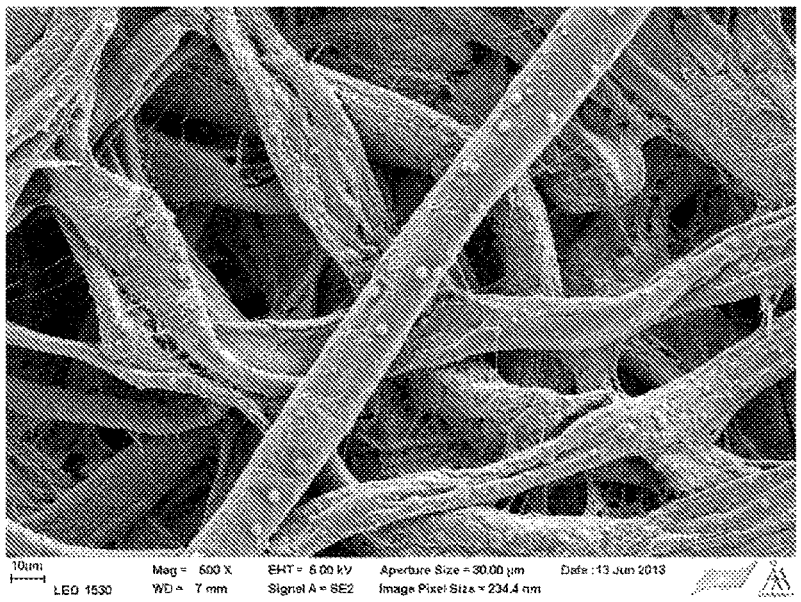

HYDROPHOBISATION COMPOSITION, METHOD FOR HYDROPHOBISATION AND SUBSTRATE

The present invention relates to a hydrophobisation composition, method for hydrophobisation as well as to a substrate according to the preambles of the enclosed independent claims.

Birch is a family of deciduous hardwood trees of the genus *Betula*. It is commonly used in industrial processes, such as pulping and papermaking and production of plywood. In these processes the tree logs are debarked, and the removed bark is typically burned at the mill, for production of energy. In principle, the removed bark is considered as waste, which has no value except its energy content. It is known that the birch bark as such is a strong and water-resistant material. It has been traditionally used in the northern hemisphere for making storage vessels, canoes, roof coverings, etc.

Hydrophobisation of various surfaces is industrially interesting. For example, there exists a demand for fibre-based packaging materials and wood products with a hydrophobic surface. Conventional hydrophobisation agents are synthetic polymers, or silicon-based substances. There is a need for natural and non-toxic hydrophobisation agents.

An object of the present invention is to minimise, or even completely eliminate, the problems existing in the prior art.

One object of the present invention is to provide a natural hydrophobisation composition, which is environmentally friendly and suitable for hydrophobisation of surfaces of various substrates.

Another object of the present invention is to provide a hydrophobisation method, which is easy, environmentally friendly and cost-effective.

Still another object of the present invention is to provide a hydrophobic substrate, which is easy, environmentally friendly and cost-effective to produce, as well as hydrophobic products thereof.

These objects are attained with the invention having the characteristics presented below in the characterising parts of the independent claims.

Some preferred embodiments of the present invention are presented in the dependent claims.

The embodiments mentioned in this text relate, where applicable, to all aspects of the invention, even if this is not always separately mentioned.

A typical hydrophobisation composition according to the present invention comprises hydrophobisation extract, which is obtained by extracting outer bark of birch in an organic and/or polar solvent and which comprises betulinol.

A typical hydrophobisation extract according to the present invention is obtained by extracting outer bark of birch in an organic and/or polar solvent and comprises betulinol.

A typical method according to the present invention for hydrophobisation of a surface comprises steps of
- applying a layer of hydrophobisation composition or extract comprising betulinol on a surface of a substrate, and
- drying and heat-treating the layer of hydrophobisation composition or extract.

A typical use according to the invention comprises use of extract, which is obtained by extracting outer bark of birch in an organic and/or polar solvent and which comprises at least 30 weight-% betulinol, for hydrophobisation of paper, paperboard, wood, plywood, textile and/or leather surface.

A typical substrate according to the present invention has a surface which is hydrophobised by using a method according to the present invention.

Now it has been surprisingly found out that the extract which is obtained by extracting outer bark of birch can be used for hydrophobisation of various substrate surfaces. A mild heat-treatment of the substrate is needed after the hydrophobisation composition or extract is applied on the substrate surface in order to achieve an effective hydrophobic effect. It has been observed that drops of water, which are applied on the surface treated with the extract, are not sucked up by the substrate. The applied water drops are staying even on a porous treated surface, such as paper, for several hours, or in some cases even for several days. The present invention thus provides an effective hydrophobisation, which is easy to achieve. It is clear that the method according to invention is widely applicable to various substrate surfaces. The exact mechanism behind the invention is not yet fully understood, but it is assumed, without wishing to be bound by a theory, that the betulinol in the extract plays an important role in achieving the surprising hydrophobic effect. One theory is that the hydrophobisation effect is obtained as result of a sublimation process of betulinol during the heat treatment.

In this context the term "extract" comprises solutions and/or dispersions which are obtained when the outer bark of birch is extracted in an organic and/or polar solvent.

According to one embodiment the outer bark of birch is extracted in an organic solvent, preferably in an organic polar solvent. According to one embodiment of the invention the organic solvent is selected from ethanol, methanol, acetone, hexane, and isopropanol, preferably from methanol and ethanol. In order to be suitable for application on the surface of various substrates, the organic solvent is preferably odourless as well as available in suitable quantities for industrial production. Most preferably the organic solvent is ethanol.

According to another embodiment of the invention the solvent is inorganic polar solvent, such as supercritical carbon dioxide ($CO_2$), whereby the extract is obtained by supercritical extraction. Extraction with a supercritical carbon dioxide ($CO_2$) is a modern technology for isolating components from different raw materials. Instead of conventional solvents, carbon dioxide in the form of fluid or supercritical fluid is used for extracting the components of interest from the natural raw material. Due to the absence of organic solvents and oxygen the extracts are free of solvent residues and oxidative damages. Supercritical $CO_2$ extraction may provide a high extraction efficiency.

The raw material for the extract is outer bark of birch. In context of this application the term "birch" comprises all deciduous hardwood trees of the genus *Betula*, such as *Betula pendula*, *Betula papyrifera* and *Betula pubescens*. Preferably, the outer bark of birch is obtained as a by-product from an industrial wood processing, such as from plywood industry and/or sulphate pulp production. Birch bark, which is separated from the wood material in production of plywood or sulphate pulp, is first crushed by using a grinder. During grinding the inner bark is ground to powder, whereas the outer bark stays in form of larger particles or shaves having normally a size >2 mm, preferably >3 mm. After grinding the outer bark is conveniently separated from inner bark by screening, for example, with a rotary screen. The inner bark may be used for energy production by burning.

According to one advantageous embodiment of the invention the extraction of the outer bark is performed in close connection of the bark source, i.e. at the sulphate pulp mill or plywood mill. The extraction is performed after grinding and screening, and the extraction residue of the outer bark may be used for energy production by burning. The obtained extract may be used for hydrophobisation of produced plywood or paper products.

Betulinol, i.e. lup-20(29)-ene-3β,28-diol, is a triterpenoid occurring naturally in birch bark. It is also known by the name betulin. The hydrophobisation extract according to one embodiment of the invention comprises at least 30 weight-% betulinol, preferably at least 80 weight-% betulinol, more preferably at least 90 weight-% betulinol. According to one embodiment of the invention the extract comprises 30-97 weight-% betulinol, preferably 60-97 weight-% betulinol, more preferably 80-95 weight-% betulinol. The weight percentages are calculated as weight-% of dry solid matter in the extract. For determination of betulinol, the extract sample is first dried in the oven and the amount of the betulinol is determined from the remaining dry solid matter.

Hydrophobisation composition may comprise a hydrophobisation extract which is obtained by extracting outer bark of birch. The composition may comprise water at the maximum of 20 weight-%, preferably <10 weight-%, more preferably <5 weight-%, even more preferably <1 weight-%. According to one embodiment of the invention the composition comprises water less than 0.1 weight-%, or even less than 0.05 weight-%. In that case the composition is in practice free from water. The percentages are calculated from the total weight of the composition in form of solution or dispersion.

The hydrophobisation composition or hydrophobisation extract may also comprise additives, such as preservatives, colorants, binders, etc. Additives may be added to the extract to improve the storage properties of the composition or extract, such as anti-crystallization agent, or to improve the attachment of the composition or extract to the substrate, such as binders. Suitable binders are, for example, latex, such as acrylate latex or styrene butadiene latex; drying oil, such as linseed oil or tung oil; or alkyd binders. Glycerol or fatty acid(s), such as tall oil fatty acid, may be added to the composition or extract as a dispersing agent and/or for improving the applicability of the composition or extract on the surface.

According to one embodiment of the invention the composition may further comprise betulinol in particle form. For example, a part of the betulinol in the extract may be precipitated by addition of small amounts of water to the composition. The betulinol particles may improve the hydrophobisation effect and/or provide other advantages.

It is possible that the hydrophobisation composition, which is applied on the surface of the substrate, is obtained by dissolving betulinol powder into an organic solvent or a polar solvent. The same solvents may be used as described above for extraction of the outer bark of birch. In this embodiment the betulinol powder is mixed with the solvent until it is dissolved, and then the obtained solution is applied on the substrate surface, dried and heat-treated as described in this application.

The hydrophobisation composition or extract may be applied on the substrate surface by using any suitable method. For example, the composition or extract may be applied by dipping, coating, painting or spraying. Any suitable coating or surface sizing apparatus used in paper production may be used for applying the hydrophobisation composition or extract to the substrate surface. The formed composition extract layer is preferably uniform and provides full coverage of the treated substrate surface.

The application step may be repeated a desired number of times in order to achieve a thick hydrophobisation layer on the substrate surface.

After the application of the hydrophobisation composition or extract to the substrate surface the substrate is heat-treated in order to spread and/or attach the composition or extract on the substrate surface. It is possible that the composition or extract is first applied on the substrate surface and then it is allowed to dry tack-free before heat-treatment, or the drying and heat-treatment are performed simultaneously at an elevated temperature. According to one preferred embodiment the drying and heat-treatment are performed simultaneously at a temperature of at least 70° C., preferably at least 85° C., more preferably at least 95° C., even more preferably at least 105° C. The heat-treatment temperature is typically in the range of 70-200° C., preferably 85-175° C., more preferably 100-150° C., even more preferably 105-135° C. The heat-treatment temperature may be selected depending on the substrate, on which the extract is applied, and on the substrate's heat tolerance. A higher heat-treatment temperature makes it possible to use a short heat-treatment time, and to speed up the process. A person skilled in the art is able to find out the optimal combination of heat-treatment temperature and heat-treatment time by making a few simple experiments.

The drying and heat-treatment of the substrate is performed simultaneously for at the most 60 min, preferably at the most 30 min, more preferably at the most 15 min, sometimes at the most 10 min. The duration of the heat-treatment is typically in the range of 3-60 min, preferably 5-50 min, more preferably 5-30 min, even more preferably 5-20 min. The duration of the heat-treatment is selected depending on the heat-treatment temperature, as described above. For example, when paper substrate is coated with the hydrophobisation composition or extract, the heat-treatment is performed at 85° C., whereby the duration of heat-treatment is about 30 min.

After the heat-treatment a hydrophobic substrate is obtained. The substrate surface has typically a contact angle with water of at least 90 degrees, preferably at least 100 degrees, more preferably at least 110 degrees, even more preferably at least 120 degrees. The substrate surface may have a contact angle with water in the range of 90-140 degrees, preferably 100-135 degrees, more preferably 120-135 degrees.

According to one embodiment of the invention the substrate comprises fibres, i.e. the substrate is paper, cardboard, textile; plywood or wood, or leather. Preferably, the composition or extract according to the invention may be used for hydrophobisation of paper, paperboard, wood, plywood, textile and/or leather surface. Textile is here understood as fabrics in general, e.g. made of cotton and clothes in particular. For example, the hydrophobisation composition or extract may be applied on the surface of a paper or paperboard surface before drying section of the paper or board machine. The composition or extract may be added to the coating composition or used as a surface size. The composition or extract may be applied on the paper surface by using conventional coating and surface sizing equipment. According to another embodiment, the composition or extract may be applied on sawn wood, e.g. boards, or plywood by spraying before storage or possible heat-treatment. For example, plywood is impulse dried at around 800° C. and the composition or extract may be applied on the plywood surface prior the drying step.

EXPERIMENTAL

Example 1

Preparation of Birch Bark Suitable for Extraction 100 kg of birch bark from a plywood mill was dried to air dryness. The bark was ground with a hammer mill. The bark was screened with a rotary sieve with a sieve with 3 mm wire mesh. The bark not passing though the screen (>3 mm, 28 kg) included 98% outer bark based on both chemical analysis and manual sorting. The material passing though the screen comprised primarily inner bark and other impurities.

Example 2

Preparation of a Hydrophobisation Extract 25 g of air dry birch outer bark prepared according to Example 1 was refluxed in 1000 ml 99% ethanol for 1 h in a 2 L round-bottom flask. The extract was recovered by filtering the solution through a filter paper. The extract contained 7.49 g of dry solids corresponding to yield of 29.9% on extracted bark. The composition of the dried extract comprised 70% betulinol, 6% lupeol, 3% betulinic acid as well a smaller amounts of triterpenoids and other birch bark extractives. The concentration of the hydrophobisation extract was 0.75% weight dry solids.

Example 3

The Temperature and Time Dependence on Hydrophobicity of Treated Filter Paper

A series of pieces of filter paper, 4 cm×1 cm, were dipped in a hydrophobisation extract prepared in accordance with Example 2. The treated pieces of filter paper were dried in an oven for various lengths of time and temperature. To achieve the same level of relative hydrophobicity, as determined by placing a drop of water on the paper surface and noting that the drop had not absorbed onto the substrate in 1 h, the following temperatures and times were observed. The concentration of applied dry hydrophobisation extract was 0.5% of the weight of the paper substrate.

25° C.—several weeks
70° C.—24h
85° C.—30 min
120° C.—15 min
150° C.—3 min

From these results we can clearly see that the drying temperature has an effect on the reaction time needed for obtaining a hydrophobic substrate.

Example 4

Application of Hydrophobisation Extract on Filter Paper

A piece of filter paper, 4 cm×1 cm, was dipped in a hydrophobisation extract prepared in accordance with Example 2. The treated piece of filter paper was dried in an oven for 24 h at 105° C. The hydrophobic property was evaluated by measuring the contact angle of a 3 µl drop of water with a contact angle measurement device. The contact angle was 126 degrees at 3 seconds after contact and the angle decreased to 118 degrees at 3 minutes. Except for the hydrophobic property the filter paper retained other typical characteristics of an untreated piece of filter paper. SEM imaging of hydrophobic filter paper revealed a thin layer of crystalline material coating the surface, shown in FIG. 1. In addition nodules of crystal a few µm in diameter can be seen.

Example 5

Application of Hydrophobisation Extract on Cotton Cloth

A piece of cotton cloth, 4 cm×1 cm, cut from a white T-shirt was dipped in a hydrophobisation extract prepared in accordance with Example 2. The treated piece of cloth was dried in an oven for 24 h at 105° C. The hydrophobic property was evaluated by measuring the contact angle of a 3 µl drop of water with a contact angle measurement device. The contact angle was 135 degrees at 3 seconds after contact and the angle decreased to 130 at 3 minutes. Except for the hydrophobic property the cotton cloth retained other typical characteristics of an untreated piece of cotton cloth.

Even if the invention was described with reference to what at present seems to be the most practical and preferred embodiments, it is appreciated that the invention shall not be limited to the embodiments described above, but the invention is intended to cover also different modifications and equivalent technical solutions within the scope of the enclosed claims.

The invention claimed is:

1. Method for hydrophobisation of a surface, comprising steps of
    applying a layer of hydrophobisation composition comprising betulinol on a surface of a substrate, and
    drying and heat-treating the layer of hydrophobisation composition.

2. Method according to claim 1, characterised in applying the hydrophobisation composition on the surface of the substrate by dipping, coating, painting or spraying.

3. Method according to claim 1, characterised in forming a uniform composition layer on the surface of the substrate, providing a full coverage of the surface.

4. Method according to claim 1, characterised in repeating the application step of the hydrophobisation composition on the surface a plurality of times.

5. Method according to claim 1, characterised in performing the heat-treatment at a temperature of at least 70° C.

6. Method according to claim 5, characterised in performing the heat-treatment simultaneously with the drying of the surface of the substrate.

7. Method according to claim 5, characterised in that the duration of the heat-treatment is in the range of 3-60 min.

8. Substrate comprising fibers and having a surface which is hydrophobised by using a method according to claim 1, the substrate surface having a contact angle with water of at least 90 degrees.

9. Substrate according to claim 8, characterised in that the substrate is a member of the group consisting of paper, paperboard, textile, wood, plywood and leather.

10. Substrate according to claim 8, characterised in that substrate surface has a contact angle with water at least 100 degrees.

11. The method of claim 1, wherein said hydrophobisation composition comprises a hydrophobisation extract, which is obtained by extracting outer bark of birch in an organic and/or polar solvent and which comprises at least 30 weight-% betulinol.

12. The method of claim 11, wherein said organic solvent of the hydrophobisation extract is selected from ethanol, methanol, acetone, hexane, and isopropanol.

13. The method of claim 11, wherein said polar solvent of the hydrophobisation extract is supercritical $CO_2$.

14. The method of claim 11, wherein said extract comprises at least 50 weight-% betulinol.

15. The method of claim 11, wherein the extract comprises 30-97 weight-% betulinol.

16. The method of claim 11, wherein said outer bark of birch is obtained as a by-product from industrial wood processing.

17. The method of claim 11, wherein the composition further comprises additives, which are selected from preservatives, dispersing agents, anti-crystallization agents, colorants and binders.

18. The method of claim 17, wherein the binder is a latex selected from the group consisting of acrylate latex, styrene butadiene latex, linseed oil, tung oil and an alkyd binder.

19. The method of claim 11, wherein said extract further comprises betulinol in particle form.

20. The method of claim 11, wherein said composition comprises water in an amount up to 20 weight-%.

* * * * *